(12) United States Patent
Ono et al.

(10) Patent No.: US 12,118,789 B2
(45) Date of Patent: Oct. 15, 2024

(54) DEVICE AND METHOD FOR TRACKING OBJECTS IN COMPOSED VIDEO

(71) Applicant: Nippon Telegraph and Telephone Corporation, Tokyo (JP)

(72) Inventors: Masato Ono, Musashino (JP); Takahide Hoshide, Musashino (JP); Yasushi Matsubara, Musashino (JP); Shinji Fukatsu, Musashino (JP); Kenichi Minami, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 437 days.

(21) Appl. No.: 17/601,664

(22) PCT Filed: Apr. 10, 2020

(86) PCT No.: PCT/JP2020/016060
§ 371 (c)(1),
(2) Date: Oct. 5, 2021

(87) PCT Pub. No.: WO2020/218023
PCT Pub. Date: Oct. 29, 2020

(65) Prior Publication Data
US 2022/0180639 A1 Jun. 9, 2022

(30) Foreign Application Priority Data
Apr. 25, 2019 (JP) .................... 2019-083755

(51) Int. Cl.
*G06V 20/40* (2022.01)
*G06T 7/20* (2017.01)

(52) U.S. Cl.
CPC ............... *G06V 20/46* (2022.01); *G06T 7/20* (2013.01); *G06T 2207/10016* (2013.01)

(58) Field of Classification Search
CPC ........ G06V 20/46; G06V 20/52; G06V 20/58; G06V 10/255; G06T 7/20;
(Continued)

(56) References Cited

U.S. PATENT DOCUMENTS 10,624,589 B2 * 4/2020 Pohl ..................... A61B 5/7425
11,257,224 B2 * 2/2022 Hiroi ....................... G06T 7/246
(Continued)

FOREIGN PATENT DOCUMENTS

| JP | 2015201005 | 11/2015 |
|---|---|---|
| JP | 2017021446 | 1/2017 |
| WO | WO 2019073920 | 4/2019 |

OTHER PUBLICATIONS

Ishii et al., "Kirari! Tracker: Human Detection and Tracking System by Usinf LiDAR and Deep Learning Engine," ITE Winter Annual Convention, 2017, 15B-3:6 pages (with English translation).

*Primary Examiner* — Manav Seth
(74) *Attorney, Agent, or Firm* — Fish & Richardson P.C.

(57) ABSTRACT

Objects are tracked in real time in a composed video acquired by joining a plurality of videos. A grouping candidate determining unit extracts objects present within an overlapping area, in which pieces of frame data are overlapped, among objects that have been detected and tracked in each of a plurality of pieces of frame data that were captured at the same time as candidate objects. A grouping unit arranges a plurality of candidate objects of which a degree of overlapping is equal to or larger than a predetermined threshold as a group, and an integration unit assigns integration object IDs to groups and objects that have not been grouped.

6 Claims, 14 Drawing Sheets

(58) Field of Classification Search
CPC . G06T 2207/10016; G06T 2207/30196; G06T 2207/30228; G06T 7/292; G06T 7/246; H04N 23/60; H04N 7/18; H04N 21/238; G06F 16/285; G06F 18/23
See application file for complete search history.

(56) References Cited

U.S. PATENT DOCUMENTS

| | | | |
|---|---|---|---|
| 11,348,269 B1* | 5/2022 | Ebrahimi Afrouzi | G01S 17/86 |
| 11,496,671 B2* | 11/2022 | Xiong | H04N 7/181 |
| 11,836,942 B2* | 12/2023 | Hasegawa | G06T 7/62 |
| 11,985,285 B2* | 5/2024 | Usui | H04N 1/00474 |
| 2015/0213110 A1* | 7/2015 | Araki | G06F 16/24578 |
| | | | 707/750 |
| 2015/0286866 A1* | 10/2015 | Kawaguchi | G06T 7/277 |
| | | | 382/103 |
| 2016/0210516 A1* | 7/2016 | Kim | H04N 7/181 |
| 2016/0330425 A1* | 11/2016 | Lim | G06V 20/52 |
| 2017/0345162 A1* | 11/2017 | Bamba | G06T 7/74 |
| 2020/0241549 A1* | 7/2020 | Tsurumi | G05D 1/0212 |
| 2021/0004967 A1* | 1/2021 | Akiyama | G06V 20/52 |
| 2024/0212173 A1* | 6/2024 | Fisher | G06V 10/764 |

* cited by examiner

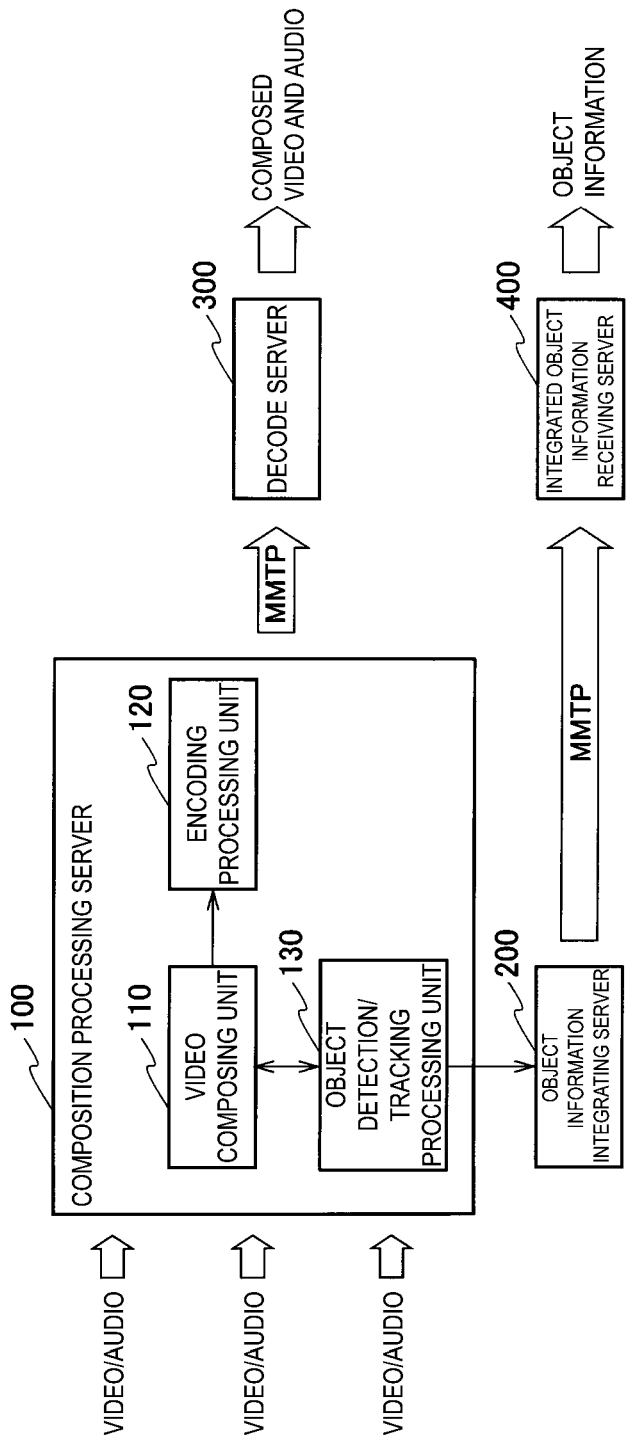

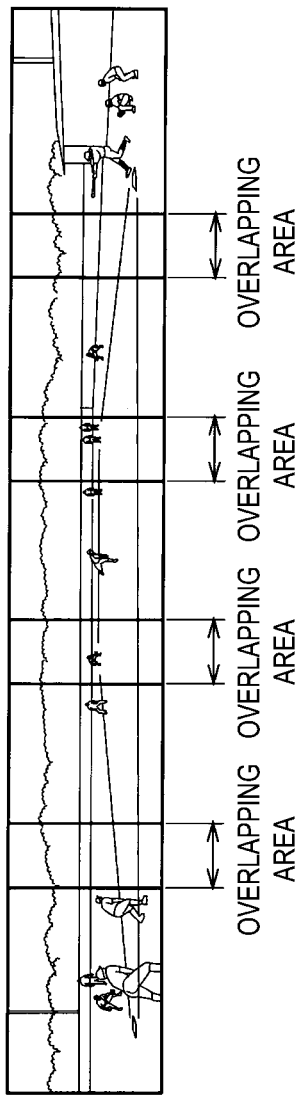

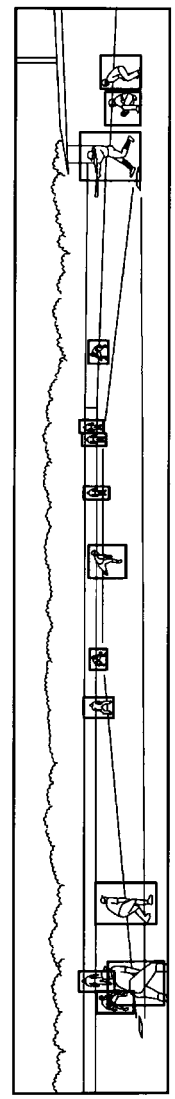

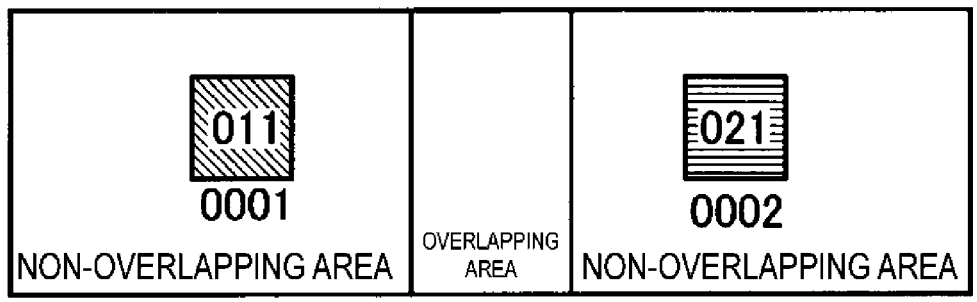
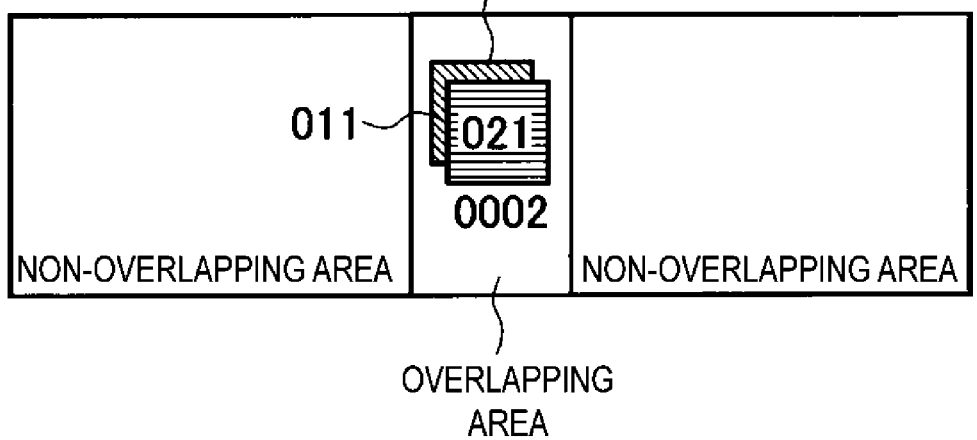
Fig. 7

DEVICE AND METHOD FOR TRACKING OBJECTS IN COMPOSED VIDEO

CROSS-REFERENCE TO RELATED APPLICATIONS

This application is a National Stage application under 35 U.S.C. § 371 of International Application No. PCT/JP2020/016060, having an International Filing Date of Apr. 10, 2020, which claims priority to Japanese Application Serial No. 2019-083755, filed on Apr. 25, 2019. The disclosure of the prior application is considered part of the disclosure of this application, and is incorporated in its entirety into this application.

TECHNICAL FIELD

The present invention relates to a technology for tracking an object in a video.

BACKGROUND ART

A technology for composing a panorama video in which an entire appearance of a field game having a wide game space is taken by joining videos captured by a plurality of cameras in horizontal/vertical directions in real time is known. An application to monitoring of a remote place of a large monitoring area by joining videos in real time using this technology is being considered.

In monitoring of a remote place using a video, it is preferable to detect and track a monitoring target object from a video in real time and to be able to display information of the monitoring target object superimposed on the video.

CITATION LIST

Non Patent Literature

[Non Patent Literature 1]
Yoko ISHII, Tetsuro TOKUNAGA, Yoshihide TONOMURA, and Kota HIDAKA, "Kirari! Tracker: Review of Real-time Specific Person Tracking System using LiDAR and Deep Learning Engine", The Institute of Image Information and Television Engineers, Winter Annual Convention, 2017, 15B-3

SUMMARY OF THE INVENTION

Technical Problem

However, a panorama video acquired by joining a plurality of videos is a high-precision video, and thus, there is a problem in that, when detection and tracking of an object is performed on a panorama video, the process takes time, and the real time property is affected.

The present invention is in consideration of the description presented above, and an objective thereof is to track an object in real time in a composed video acquired by joining a plurality of videos.

Means for Solving the Problem

An object information processing device according to the present invention is an object information processing device that tracks objects in a composed video composed by joining a plurality of pieces of video data acquired by imaging parts of an imaging area in an overlapping manner. It includes: a candidate extracting unit configured to extract objects present within an overlapping area in which the video data is overlapped among objects detected and tracked in each of the plurality of pieces of video data as candidate objects; a grouping unit configured to arrange a plurality of candidate objects of which a degree of overlapping is equal to or larger than a predetermined threshold into a group; and an integration unit configured to assign integration object IDs to the group and the objects that have not been grouped.

An object information processing method according to the present invention is an object information processing method using an object information processing device that tracks objects in a composed video composed by joining a plurality of pieces of video data acquired by imaging parts of an imaging area in an overlapping manner. It includes: extracting objects present within an overlapping area in which the video data is overlapped among objects detected and tracked in each of the plurality of pieces of video data as candidate objects; arranging a plurality of candidate objects of which a degree of overlapping is equal to or larger than a predetermined threshold into a group; and assigning integration object IDs to the group and the objects that have not been grouped.

An object information processing program according to the present invention operates a computer as each of the units of the object information processing device described above.

Effects of the Invention

According to the present invention, an object can be tracked in real time in a composed video acquired by joining a plurality of videos.

BRIEF DESCRIPTION OF DRAWINGS

FIG. 1 is a diagram illustrating the configuration of a wide viewing angle remote monitoring system configured using an object information processing device according to an embodiment.

FIG. 2(*b*) is a diagram illustrating an aspect in which a plurality of videos are joined.

FIG. 2(*c*) is a diagram illustrating an example of display of a panorama video output by the wide viewing angle remote monitoring system.

FIG. 7 is a diagram illustrating an example in which grouping is not performed.

FIG. 8(*b*) is a diagram illustrating an example of regrouping groups including the same object detected in a plurality of overlapping areas.

DESCRIPTION OF EMBODIMENTS

Figure 2A:
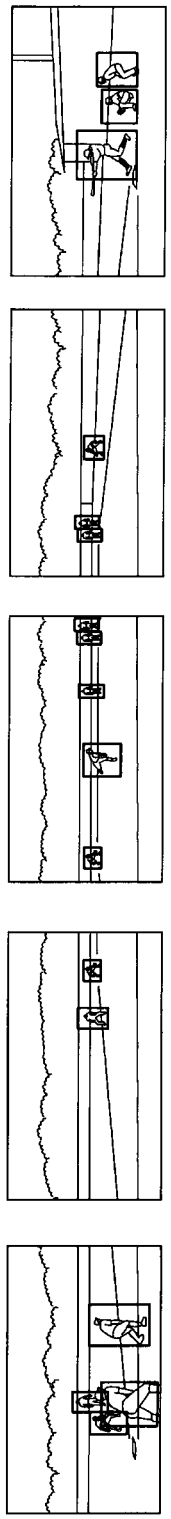
FIG. 2(*a*) is a diagram illustrating an aspect in which objects are detected from each of the input videos input by the wide viewing angle remote monitoring system.

Hereinafter, an embodiment of the present invention will be described with reference to the drawings. In description of the drawings below, the same or similar components are designated by the same or similar reference signs.

The configuration of a wide viewing angle remote monitoring system using object information processing according to the present invention will be described with reference to FIG. 1. The wide viewing angle remote monitoring system illustrated in the drawing is a system that realizes low latency processing of generating a panorama video acquired by composing a plurality of videos, acquiring object information on a monitoring target object from the video, and synchronously transmitting the panorama video, audio, and object information through an IP network using an MPEG Media Transport Protocol (MMTP). For example, the wide viewing angle remote monitoring system can be used for wide viewing angle monitoring such as air traffic control, public space monitoring, disaster monitoring, and the like.

The wide viewing angle remote monitoring system illustrated in FIG. 1 includes a composition processing server 100, an object information integrating server 200, a decode server 300, and an integrated object information receiving server 400.

The composition processing server 100 includes a composition processing unit 110, an encoding processing unit 120, and an object detection/tracking processing unit 130. The composition processing server 100 receives a video and audio from each of a plurality of imaging systems (for example, 4K cameras) as inputs, performs detection and tracking of a target object from each video (FIG. 2(*a*)), and composes a panorama video by joining the videos (FIG. 2(*b*)).

The composition processing unit 110 composes a panorama video by joining a plurality of input videos in real time. The composition processing unit 110 may dynamically change seams at which the videos are stitched or may statically set seams in advance using a setting file or the like.

The encoding processing unit 120 encodes the panorama video composed by the composition processing unit 110 and audio data to convert the resultant of encoding into an MMTP stream, and transmits the MMTP stream to the decode server 300.

The object detection/tracking processing unit 130 performs detection and tracking of a target object from each video. The object detection/tracking processing unit 130 transmits a result of tracking of an object in each video to the composition processing unit 110 and also transmits the result to the object information integrating server 200.

For an object that has been detected and tracked in each video by the object detection/tracking processing unit 130, the object information integrating server 200 converts coordinates of the object in each video into coordinates in a panorama video. In a case where an object is detected in a video before composition, in an overlapping area in which videos overlap, there are cases in which the same object is detected in each of the overlapping videos. The object information integrating server 200 integrates tracking results of objects that are estimated to be the same among objects detected in the overlapping area using object information processing according to the present invention. Details of the object information processing according to the present invention will be described below.

The decode server 300 decodes an MMTP stream received from the composition processing server 100 and outputs a panorama video and audio.

The integrated object information receiving server 400 receives MMTP packets of object information from the object information integrating server 200 and outputs the object information.

A display system (for example, a panorama screen) displays the object information output from the integrated object information receiving server 400 superimposed on the panorama video output from the decode server 300 (FIG. 2(*c*)). At this time, the display system superimposes object information having a time stamp such as a time stamp attached to frame data of the panorama video.

Configuration of Object Information Processing Device

The configuration of the object information processing device 1 according to the embodiment will be described with reference to FIG. 3. The object information processing device 1 is a device that outputs results of tracking of objects in a panorama video composed by a video processing device 3. More specifically, the object information processing device 1 receives a tracking result of an object in each video from the video processing device 3, converts coordinates of the object in each video (hereinafter referred to as "local coordinates") into coordinates in the panorama video (hereinafter referred to as "global coordinates"), and integrates tracking results of objects regarded as being the same in an overlapping area. The object information processing device 1 corresponds to the object information integrating server 200 of the wide viewing angle remote monitoring system illustrated in FIG. 1, and the video processing device 3 corresponds to the composition processing server 100.

Figure 3:
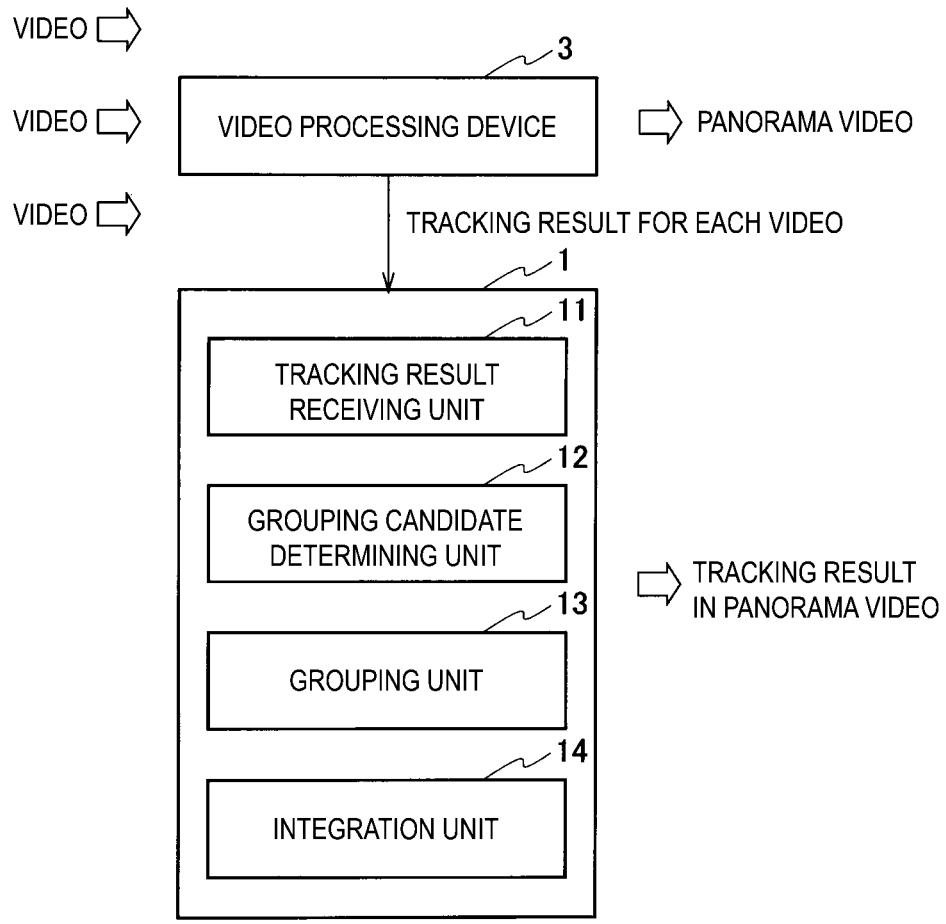
FIG. 3 is a functional block diagram illustrating the configuration of an object information processing device according to the embodiment.

The object information processing device 1 illustrated in FIG. 3 includes a tracking result receiving unit 11, a grouping candidate determining unit 12, a grouping unit 13, and an integration unit 14. Each of the units included in the object information processing device 1 may be configured by a computer including an operation processing device, a storage device, and the like, and a process of each of the units may be executed using a program. This program is stored in a storage device included in the object information processing device 1 and may be recorded on a recording medium such as a magnetic disk, an optical disc, a semiconductor memory, or the like and may be provided through a network.

The tracking result receiving unit 11 receives a tracking result of an object in each video and converts local coordinates of the object into global coordinates. The tracking result includes local coordinates and a local object ID of the object. The tracking result may include a name, a degree of reliability (correctness of a name of the object), and a color of the detected object and an acceleration and a movement direction of the object. The local object ID is an identifier that is assigned to an object that is being tracked in each video. The same local object ID is assigned to an object that is determined to be the same as an object detected in a previous generation (past frame). A local object ID is assigned to an object for each video, and thus, in a case where shown videos of the same objects are different from each other, different local object IDs are assigned to the objects of the videos.

The grouping candidate determining unit 12 extracts objects detected within an overlapping area as integration targets. The coordinates of an overlapping area have been calculated in advance. The object information processing device 1 may be configured to receive coordinates of an overlapping area from the video processing device 3.

The grouping unit 13 performs grouping by estimating objects, of which a degree of overlapping between objects is high, detected in overlapping videos in an overlapping area as the same objects. In addition, the grouping unit 13 performs re-grouping by arranging groups together including objects to which the same local object ID is assigned in overlapping areas (different overlapping areas within one video) that are adjacent to each other.

The integration unit 14 assigns an integration object ID that is a tracking result on a panorama video to each of groups and objects that are not grouped. By using this integration object ID, the same object can be continuously tracked in a panorama video.

Object Information Processing

Figure 4:
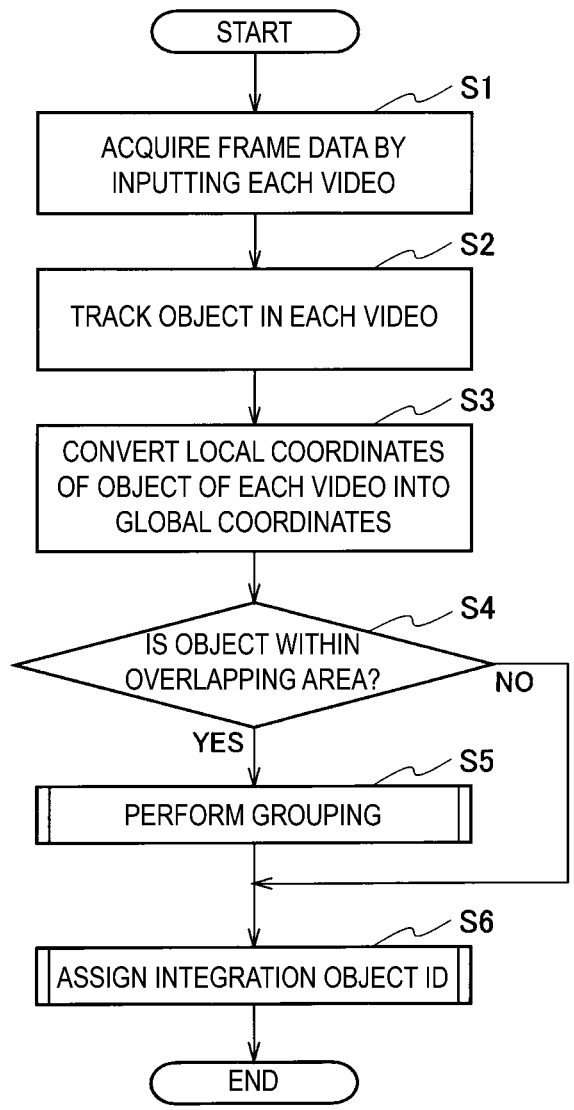
FIG. 4 is a flowchart illustrating the flow of object information processing according to the embodiment.
Figure 5:
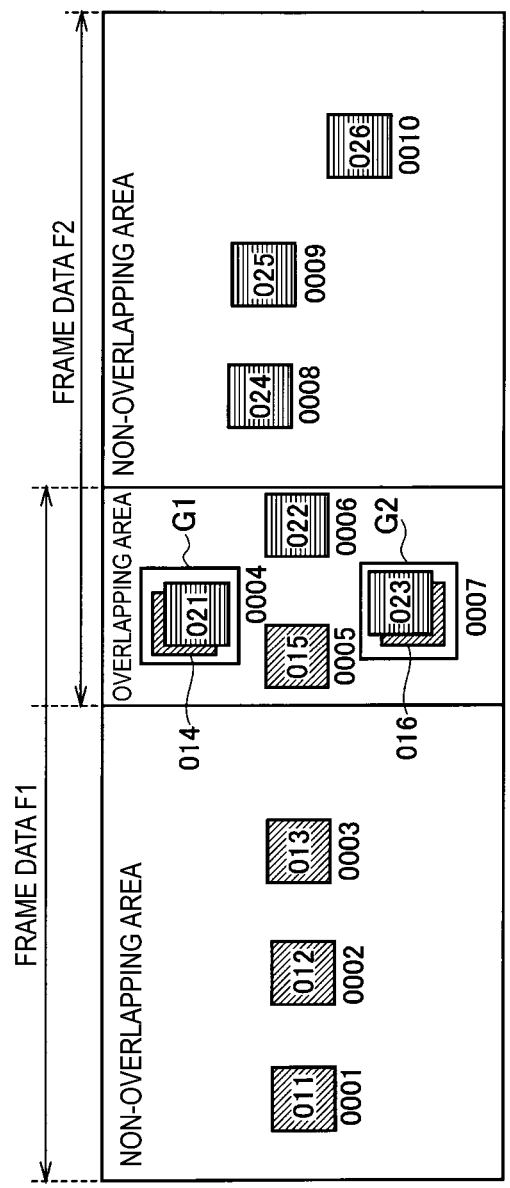
FIG. 5 is a diagram illustrating an example of a panorama video acquired by joining frame data and detected objects.

Next, object information processing according to the embodiment will be described with reference to FIGS. 4 and 5.

In Step S1, the video processing device 3 receives videos from a plurality of cameras as inputs and acquires frame data for the same time from each of the input videos.

In Step S2, the video processing device 3 detects an object from each video and tracks the object in each video. In order to increase the speed of the object detection process, the video processing device 3 may detect an object using data acquired by reducing the size of frame data acquired from each video. The detection and tracking of an object may be performed in parallel for each video. The tracking is tracking of the movement of an object by determining the similarity between an object detected in current frame data and an object detected in past frame data.

The video processing device 3 composes a panorama video by overlapping frame data F1 and F2 such that feature points of the frame data F1 and F2 of the same time adjacent to each other coincide with each other. FIG. 5 illustrates an aspect in which horizontally adjacent frame data F1 and F2 overlaps. An area in which the frame data F1 and F2 overlaps is an overlapping area. An area in which data does not overlap will be referred to as a non-overlapping area. A panorama video may be composed by overlapping pieces of frame data that are vertically adjacent to each other, and a panorama video may be composed by overlapping frame data that is aligned vertically and horizontally.

In addition, the video processing device 3 detects an object from each video before composition of a panorama video and tracks the object. In the example illustrated in FIG. 5, the video processing device 3 detects six objects O11 to O16 from the frame data F1 and detects six objects O21 to O26 from the frame data F2. A tracking result of objects in each video is transmitted to the object information processing device 1.

In Step S3, the object information processing device 1 receives a tracking result of objects in each video and converts local coordinates of each object into global coordinates.

In Step S4, the object information processing device 1 determines whether or not objects are present within an overlapping area. The objects present within an overlapping area are candidates for grouping. In the example illustrated in FIG. 5, objects O14, O15, and O16 detected in the frame data F1 are present within the overlapping area, and objects O21, O22, and O23 detected in the frame data F2 are present within the overlapping area.

In Step S5, the object information processing device 1 groups local objects, which simultaneously appear in a plurality of videos, and are estimated to be the same object. The object information processing device 1 estimates objects, of which a degree of overlapping is equal to or larger than a predetermined threshold among objects detected in an overlapping area of pieces of frame data that are adjacent to each other, to be the same object and groups the estimated objects. In the example illustrated in FIG. 5, the object O14 detected in the frame data F1 and the object O21 detected in the frame data F2 are grouped into a group G1, and the object O16 detected in the frame data F1 and the object O23 detected in the frame data F2 are grouped into a group G2. Details of the grouping process will be described below.

In Step S6, the object information processing device 1 assigns integration object IDs to groups acquired by grouping objects and each object that has not been grouped. In the example illustrated in FIG. 5, numbers written below groups and objects are assigned integration object IDs. More specifically, integration object IDs of the groups G1 and G2 are respectively "0004" and "0007." Integration object IDs of objects O11, O12, O13, and O15 that have not been grouped are respectively "0001," "0002," "0003," and "0005." Integration object IDs of objects O22, O24, O25, and O26 that have not been grouped are respectively "0006," "0008," "0009," and "0010." Details of the process of assigning integration object IDs will be described below.

Figure 6:
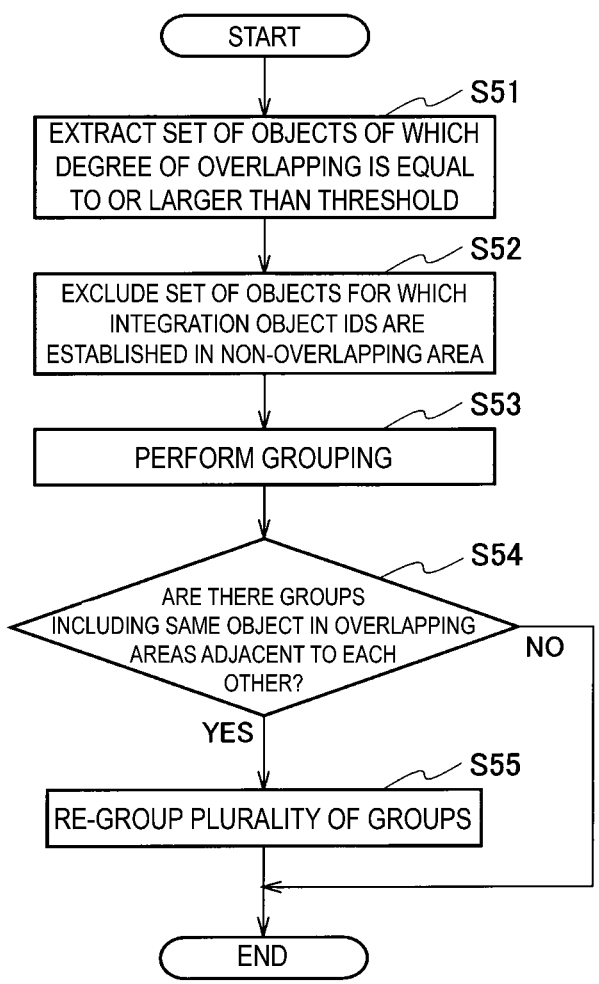
FIG. 6 is a flowchart illustrating the flow of a grouping process.

Grouping Next, a grouping process will be described with reference to FIG. 6. The grouping process is performed on objects detected within an overlapping area.

In Step S51, the grouping unit 13 extracts sets of objects of which a degree of overlapping between objects detected in each of pieces of frame data adjacent to each other is equal to or larger than a threshold. For a certain object, in a case where there is no object of which a degree of overlapping therewith is equal to or larger than the threshold in adjacent frame data, the object is not a grouping target. The number of objects to be extracted may be changed in accordance with the number of pieces of frame data overlapped in an overlapping area. For example, in a case where frame data overlaps and is aligned vertically and horizontally, four pieces of frame data may overlap at each corner part of the frame data. In such a case, the grouping unit 13 may extract four objects as grouping targets.

In Step S52, the grouping unit 13 sets a set, in which an integration object ID has been established for any object in a non-overlapping area among sets of objects of which a degree of overlapping is equal to or larger than the threshold, as a non-grouping target. For example, as illustrated in FIG. 7, in a past generation, it is assumed that an integration object ID "0001" has been assigned to the object O11 in a non-overlapping area, and an integration object ID "0002" has been assigned to the object O21 in a non-overlapping area. In other words, in the past generation, the objects O11 and O21 are recognized as separate objects. In a current generation, even when a degree of overlapping between the objects O11 and O21 is equal to or larger than the threshold, for the objects O11 and O21, integration object IDs are established in a non-overlapping area, and thus the objects O11 and O21 are separate objects. Thus, the grouping unit 13 sets a set of the objects O11 and O21 as a non-grouping target.

For example, when an integration object ID is assigned to an object in an overlapping area, the integration unit 14 sets a flag of the object to on. The grouping unit 13 sets a set of objects of which all the flags are on as a non-grouping target. A set of objects in which a flag of one object is on and a flag of the other object is off is a grouping target.

As a method for setting a non-grouping target, in a case where a name representing each detected object is estimated, the grouping unit 13 may set a set of objects of which names are different from each other as a non-grouping target. For example, a set of an object estimated as a person and an object estimated as a signal is set as a non-grouping target.

In addition, in a case where colors of objects are clearly different from each other, the grouping unit 13 may set a set of the objects as a non-grouping target.

Furthermore, in a case where movement directions of objects are perceived, and objects are moving in different directions, the grouping unit 13 may set a set of the objects as a non-grouping target.

In Step S53, the grouping unit 13 groups sets that have not been excluded in Step S52 among sets of objects of which a degree of overlapping between the objects is equal to or larger than the threshold.

In the following Steps S54 and S55, the grouping unit 13 may perform regrouping by arranging groups including the same objects together.

In Step S54, the grouping unit 13 determines whether or not a group including the same object is present in overlapping areas adjacent to each other. Overlapping areas adjacent to each other are a plurality of overlapping areas in data of one frame. For example, in the example illustrated in FIG. 8(a), overlapping areas disposed on the left side and the right side of the frame data F2 are overlapping areas adjacent to each other. Whether or not objects are the same can be determined based on whether or not local object IDs are the same.

Figure 8A:
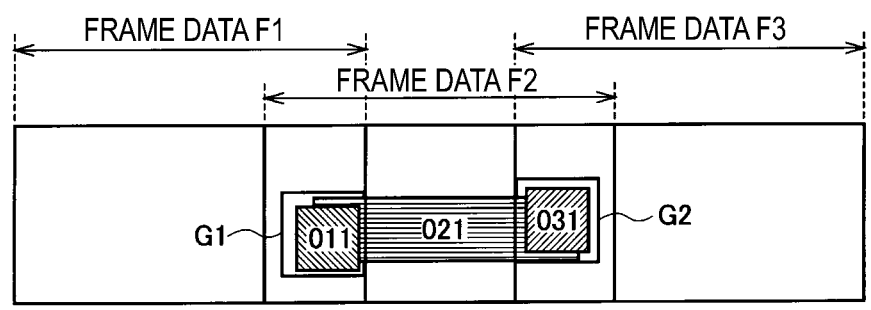
FIG. 8(*a*) is a diagram illustrating an example in which the same object is detected in a plurality of overlapping areas.

In the example illustrated in FIG. 8(a), an object O11 detected in frame data F1 and an object O21 detected in frame data F2 are grouped as a group G1. In addition, an object O31 detected in frame data F3 and an object O21 detected in frame data F2 are grouped as a group G2. The groups G1 and G2 include the same object O21.

Figure 8B:
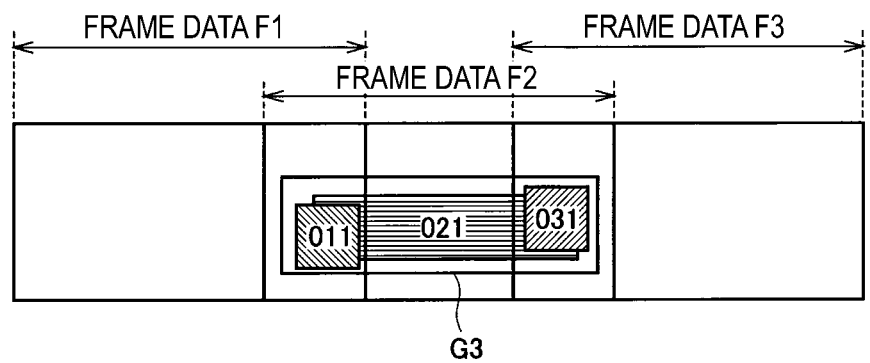

In Step S55, the grouping unit 13 performs re-grouping by arranging the groups including the same object together. In the example illustrated in FIG. 8(b), the groups G1 and G2 including the same object O21 are regrouped as a group G3.

Assignment of Integration Object ID Next, a process of assigning integration object IDs will be described.

Figure 9:
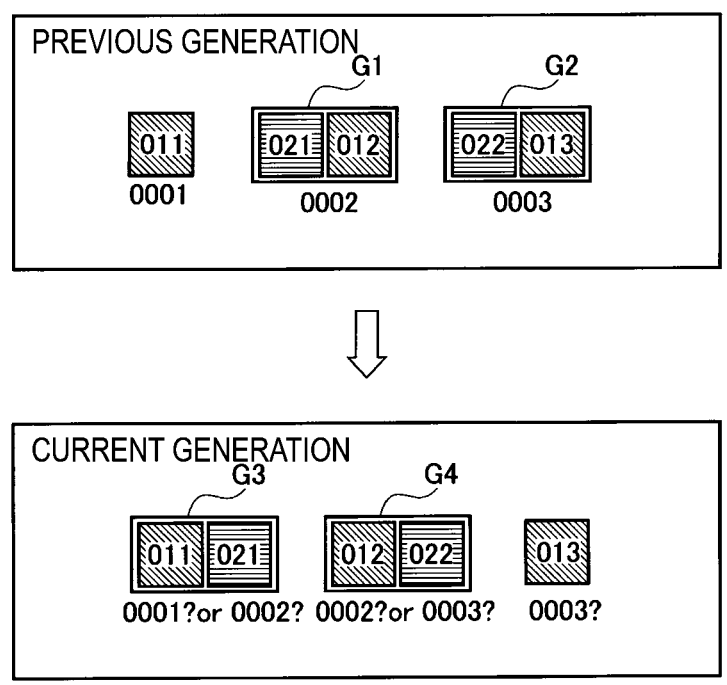
FIG. 9 is a diagram illustrating an example in which a group or an object taking over an integration object ID cannot be identified.

For example, as illustrated in FIG. 9, in a case where grouped objects change, a group taking over an integration object ID assigned to a group in the previous generation cannot be identified. In the example illustrated in FIG. 9, in the previous generation, an integration object ID of an object O11 is "0001," an integration object ID of a group G1 including objects O12 and O21 is "0002," and an integration object ID of a group G2 including objects O13 and O22 is "0003." In a current generation, it is assumed that a set of the objects O11 and O21 has been grouped into a group G3, a set of objects O12 and O22 has been grouped into a group G4, and the object O13 has not been grouped.

In the example illustrated in FIG. 9, in the current generation, it is unclear whether the integration object ID "0003" of the group G2 including the objects O13 and O22 should be taken over by the group G4 including the object O22 or should be taken over by the object O13. In addition, it is unclear whether the group G3 should take over the integration object ID "0001" of the object O11 of the previous generation or should take over the integration object ID "0002" of the group G1 including the object O21.

Thus, in the embodiment, a time (a survival duration) in which each object is tracked in each video is managed, and integration object IDs are assigned to objects in order of longest to shortest survival durations of the objects. For example, in the example illustrated in FIG. 9, if a survival duration of the object O13 is longer than a survival duration of the object O22, the process is performed from the object O13, and the object O13 takes over the integration object ID "0003" of the group G2. At this time, the processing order of the object O22 having no integration object ID to be taken over is postponed. For example, the processing order of the object O22 is lowered to be in the same level as that of an object that is newly detected. The object O22 is handled as an object to which an integration object ID has not been assigned in the previous generation.

In the example illustrated in FIG. 9, it is unclear whether or not the group G3 should take over one of the integration object ID "0001" or "0002." In the embodiment, in a case where a plurality of integration object IDs can be taken over, an integration object ID having the longest survival duration is taken over. An integration object ID having the longest survival duration is an integration object ID that has been delivered at an earlier time. More specifically, if the survival duration of the integration object ID "0001" is longer than the survival duration of the integration object ID "0002," the group G3 takes over the integration object ID "0001."

Figure 10:
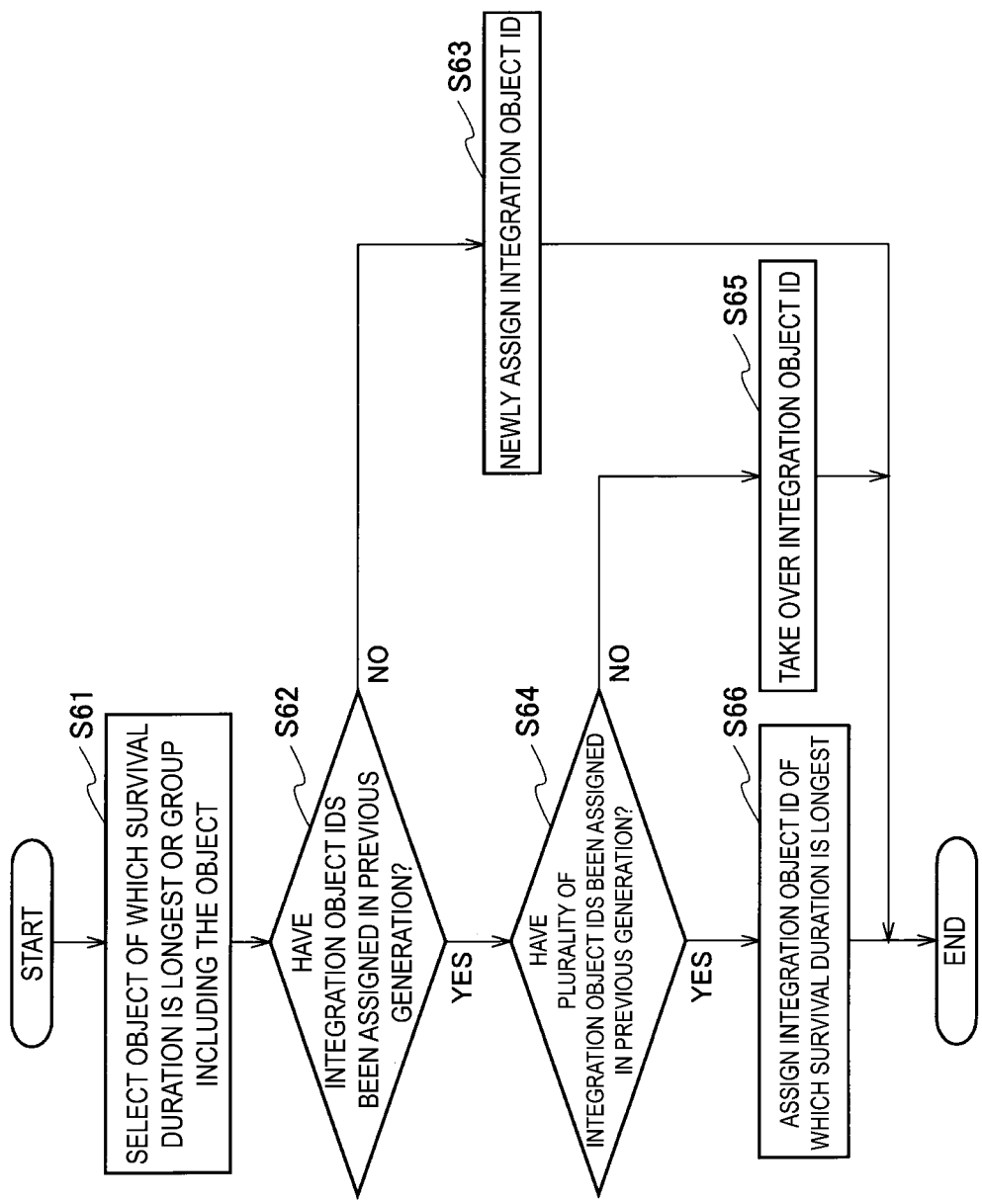
FIG. 10 is a flowchart illustrating the flow of a process of assigning an integration object ID.

The process of assigning integration object IDs will be described with reference to FIG. 10. The process illustrated in FIG. 10 is performed on all the groups and all the objects that have not been grouped.

In Step S61, the integration unit 14 selects an object for which the survival duration is the longest or a group including an object for which the survival duration is the longest.

In Step S62, the integration unit 14 determines whether or not an integration object ID has been assigned to an object or a group that is a processing target in the previous generation. In a case where the processing target is a group, it is determined whether or not an integration object ID has been assigned to at least any one of objects included in the group.

In accordance with a determination that an integration object ID has not been assigned in the previous generation, the integration unit 14 newly assigns an integration object ID to the object or the group that is the processing target in Step S63.

In Step S64, the integration unit 14 determines whether or not the group that is the processing target includes a plurality of objects to which different integration object IDs have been assigned.

In accordance with a determination that the processing target is an object or in a case where a group that is the processing target does not include a plurality of objects to which different integration object IDs are assigned, in other words, in a case where an integration object ID to be taken over is set to one, the integration unit 14 causes the object or the group that is the processing target to take over the integration object ID of the previous generation in Step S65.

In accordance with a determination that the group that is the processing target includes a plurality of objects to which different integration object IDs have been assigned, the integration unit 14 causes the group that is the processing target to take over an integration object ID of which the survival duration is the longest in Step S66.

The integration unit 14 performs the process described above on all the groups and all the objects.

An example of assignment of integration object IDs will be described with reference to FIG. 11.

Figure 11:
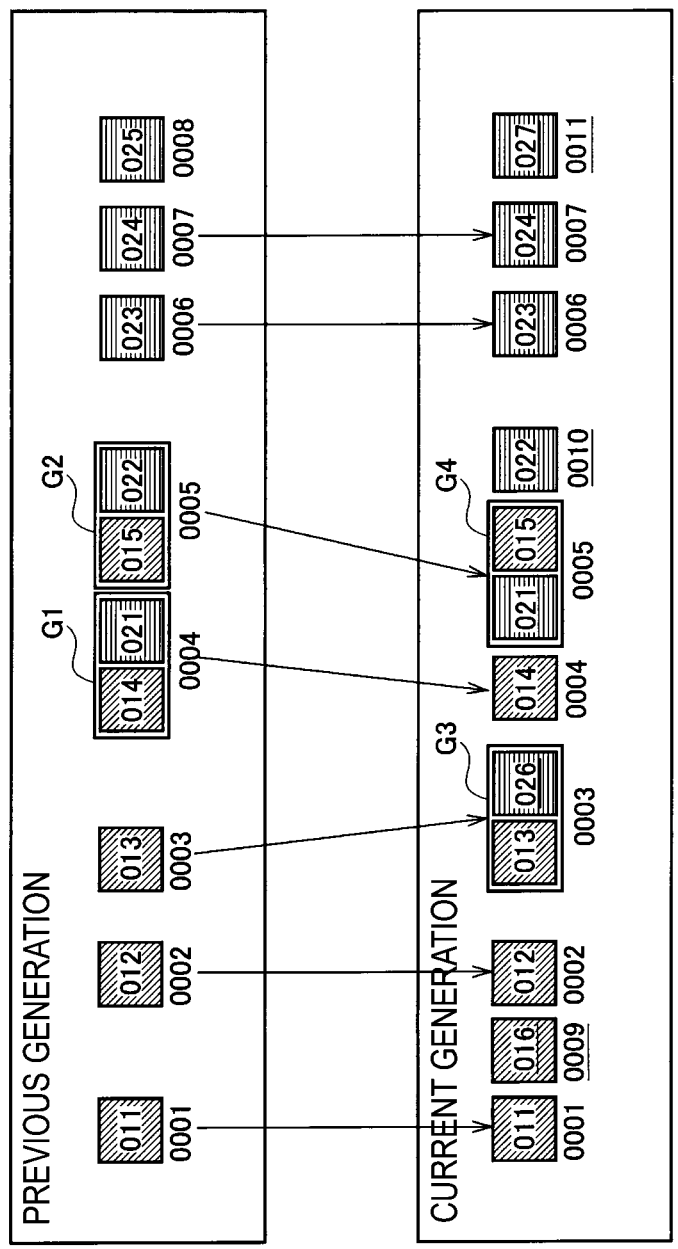
FIG. 11 is a diagram illustrating an example of assigning an integration object ID.

In the example illustrated in FIG. 11, in a previous generation (one frame before), five objects O11, O12, O13, O14, and O15 have been detected from one piece of frame data, and five objects O21, O22, O23, O24, and O25 have been detected from the other piece of frame data. The objects O14 and O21 are grouped into a group G1, and the objects O15 and O22 are grouped into a group G2. Integration object IDs "0001," "0002", and "0003" have been respectively assigned to the objects O11, O12, and O13. Integration object IDs "0004" and "0005" have been respectively assigned to the groups G1 and G2. Integration object IDs "0006," "0007," and "0008" have been respectively assigned to the objects O23, O24, and O25.

In a current generation (latest frame), an object O16 has been newly detected from one piece of frame data. Two objects O26 and O27 have been newly detected from the other piece of frame data. The object O25 that has been detected in the previous generation is not detected in the current generation.

The object O26 that has been newly detected and the object O13 are grouped into a group G3. The object O15 and the object O21 are grouped into a group G4. The object O14 and the object O22 have not been grouped.

The objects O11, O12, O23, and O24 that have not been grouped in the previous generation and have not been grouped also in the current generation take over integration object IDs of the previous generation.

New integration object IDs "0009" and "0011" are respectively delivered to the objects O16 and O27 that have not been grouped and have been newly detected.

The integration object ID "0008" that has been assigned to the object O25 for which the current generation has not been detected is deleted.

Processes for the objects O14, O15, O21, and O22 that have been grouped in the previous generation and the objects O13 and O26 that have been grouped in the current generation will be considered. Here, it is assumed that the survival duration of an object is longer in order of the objects O13, O14, O15, O21, O22, and O26.

First, a group G3 including the object O13 is a processing target. An integration object ID "0003" has been assigned to the object O13 in the previous generation. An object O26 included in the group G3 is a newly-detected object, and an integration object ID has not been assigned thereto. Thus, the group G3 takes over the integration object ID "0003" of the object O13.

Subsequently, the object O14 becomes the processing target. The object O14 is included in the group G1 in the previous generation. An integration object ID "0004" is assigned to the group G1. Thus, the object O14 takes over the integration object ID "0004" of the group G1.

The object O21 included in the group G1 in the previous generation is handled as an object to which an integration object ID has not been assigned in the previous generation, and the order of the process thereof is lowered.

Subsequently, the group G4 including the object O15 becomes the processing target. The object O15 has been included in the group G2 in the previous generation. An integration object ID "0005" is assigned to the group G2. Although the object O21 has been included in the group G1 in the previous generation, it becomes an object to which an integration object ID has not been assigned at the time of processing the object O14. Thus, the group G4 takes over the integration object ID "0005" of the group G2.

The object O22 included in the group G2 in the previous generation is handled as an object to which an integration object ID has not been assigned in the previous generation, and the order of the process thereof is lowered.

Finally, the object O22 becomes the processing target. Although the object O22 has been included in the group G2 in the previous generation, it becomes an object to which an integration object ID has not been assigned at the time of processing the object O15. Thus, a new integration object ID "0010" is delivered to the object O22.

According to the process described above, the integration unit 14 can cause integration object IDs to be appropriately taken over.

As described above, according to the embodiment, the grouping candidate determining unit 12 extracts objects present within an overlapping area, in which pieces of frame data are overlapped, among objects that have been detected and tracked in each of a plurality of pieces of frame data that were captured at the same time as candidate objects. The grouping unit 13 arranges a plurality of candidate objects of which a degree of overlapping is equal to or larger than a predetermined threshold as a group and the integration unit 14 assigns integration object IDs to groups and objects that have not been grouped, whereby object tracking processes can be performed in parallel in individual videos in a case where the videos are composed. Thus, a processing time of the tracking can be shortened, and the object information processing according to the embodiment can be performed in parallel with a video composition process. As a result, an object can be tracked in real time in a composed video.

REFERENCE SIGNS LIST

1 Object information processing device
11 Tracking result receiving unit
12 Grouping candidate determining unit
13 Grouping unit
14 Integration unit
3 Video processing device
100 Composition processing server
110 Composition processing unit
120 Encoding processing unit
130 Object detection/tracking processing unit
200 Object information integrating server
300 Decode server
400 Integrated object information receiving server

The invention claimed is:

1. An object information processing device for tracking objects in a composed video composed by joining a plurality of pieces of video data acquired by imaging parts of an imaging area in an overlapping manner, the object information processing device comprising one or more storage media storing instructions and one or more processors configured to execute the instructions, wherein execution of the instructions cause the one or more processors to perform operations including:

extracting objects present within an overlapping area in which video data is overlapped among objects detected and tracked in each of the plurality of pieces of video data as candidate objects;

arranging a plurality of candidate objects of which a degree of overlapping is equal to or larger than a predetermined threshold into a group;

excluding, from the candidate objects that are eligible to be arranged in the group, objects that have been recognized as separate objects in past; and assigning integration object IDs to the group and the objects that have not been grouped.

2. The object information processing device according to claim 1, wherein execution of the instructions cause the one or more processors to perform operations further comprising: in a case where groups including the same candidate object are present in each of a plurality of overlapping areas within the same video data, merging a plurality of the groups into one group.

3. The object information processing device according to claim 1, wherein assigning the integration object IDs to the group and the objects that have not been grouped comprises:
   determining, for each object that has been detected in the video data, a respective survival duration which is a time duration for which the object has been tracked in the video data;
   at a current frame of the video data, determining whether the identified group includes objects that have been assigned with multiple integration object IDs for previous frames of the video data; and
   in response to determining that the identified group includes objects that have been assigned with multiple integration object IDs for previous frames of the video data, selecting the integration object ID that has been assigned to the object in the group for which the survival duration is the longest, and assigning the selected integration object ID to the group.

4. An object information processing method for tracking objects in a composed video composed by joining a plurality of pieces of video data acquired by imaging parts of an imaging area in an overlapping manner, the object information processing method comprising:
   extracting objects present within an overlapping area in which video data is overlapped among objects detected and tracked in each of the plurality of pieces of video data as candidate objects;
   arranging a plurality of candidate objects of which a degree of overlapping is equal to or larger than a predetermined threshold into a group;
   excluding, from the candidate objects that are eligible to be arranged in the group, objects that have been recognized as separate objects in past; and
   assigning integration object IDs to the group and the objects that have not been grouped.

5. A non-transitory computer readable storage medium having stored thereon an object information processing program, that upon execution, cause a computer to perform operations for tracking objects in a composed video composed by joining a plurality of pieces of video data acquired by imaging parts of an imaging area in an overlapping manner, the operations comprising:
   extracting objects present within an overlapping area in which video data is overlapped among objects detected and tracked in each of the plurality of pieces of video data as candidate objects;
   arranging a plurality of candidate objects of which a degree of overlapping is equal to or larger than a predetermined threshold into a group;
   excluding, from the candidate objects that are eligible to be arranged in the group, objects that have been recognized as separate objects in past; and
   assigning integration object IDs to the group and the objects that have not been grouped.

6. The object information processing device according to claim 1, wherein the operations further comprise:
   changing the number of candidate objects to be arranged into the group according to the number of overlapped video data in the overlapping area.

* * * * *